W. J. COMFORT.
MECHANICAL MOTOR.
APPLICATION FILED JUNE 17, 1908.
914,926.
Patented Mar. 9, 1909.
2 SHEETS—SHEET 2.
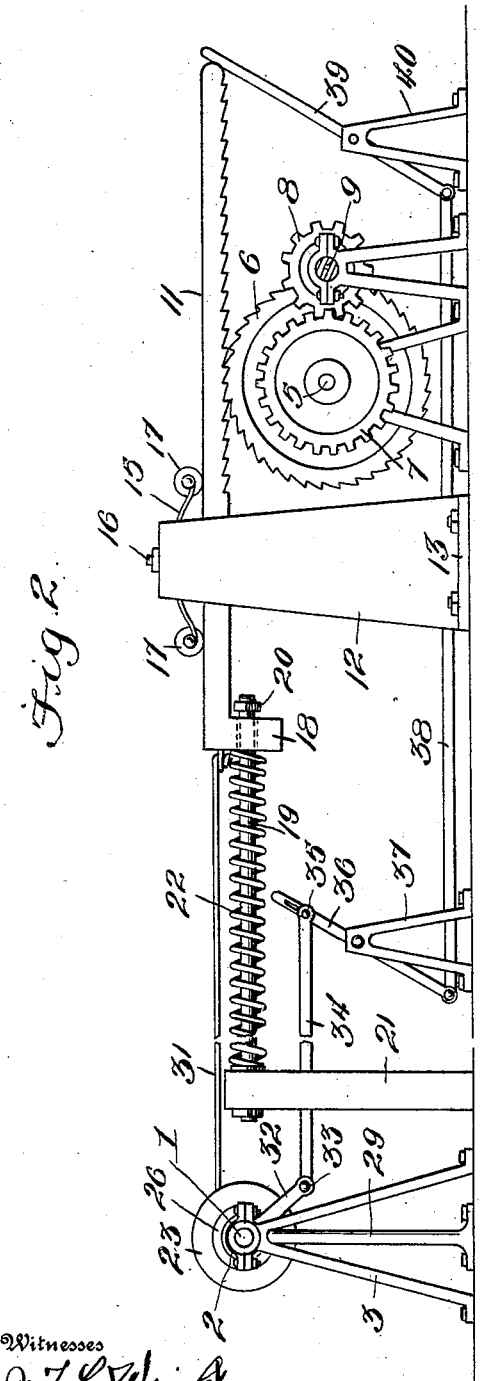
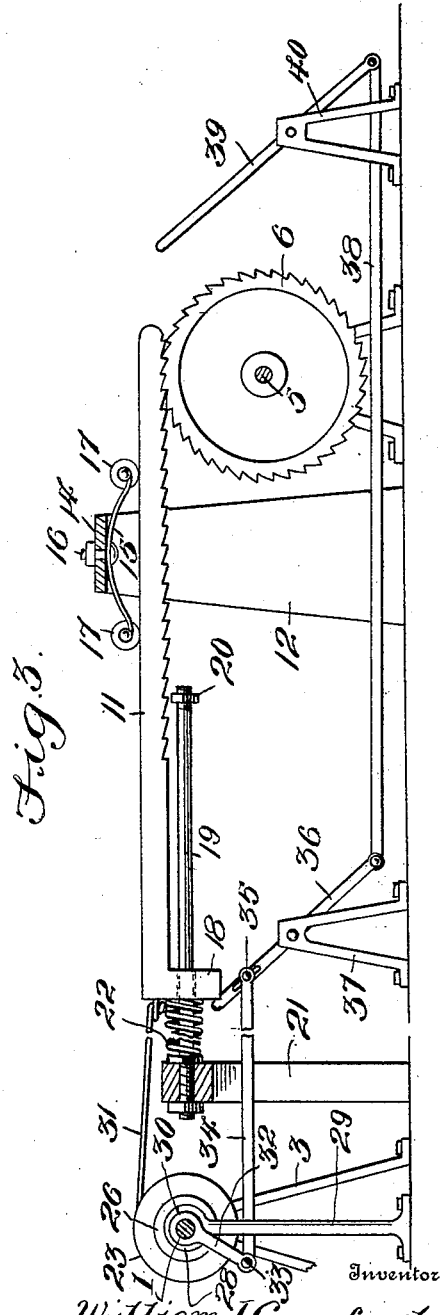
Witnesses
J. L. Wright
A. C. Hines
Inventor
William J. Comfort,
By Victor J. Evans,
Attorney

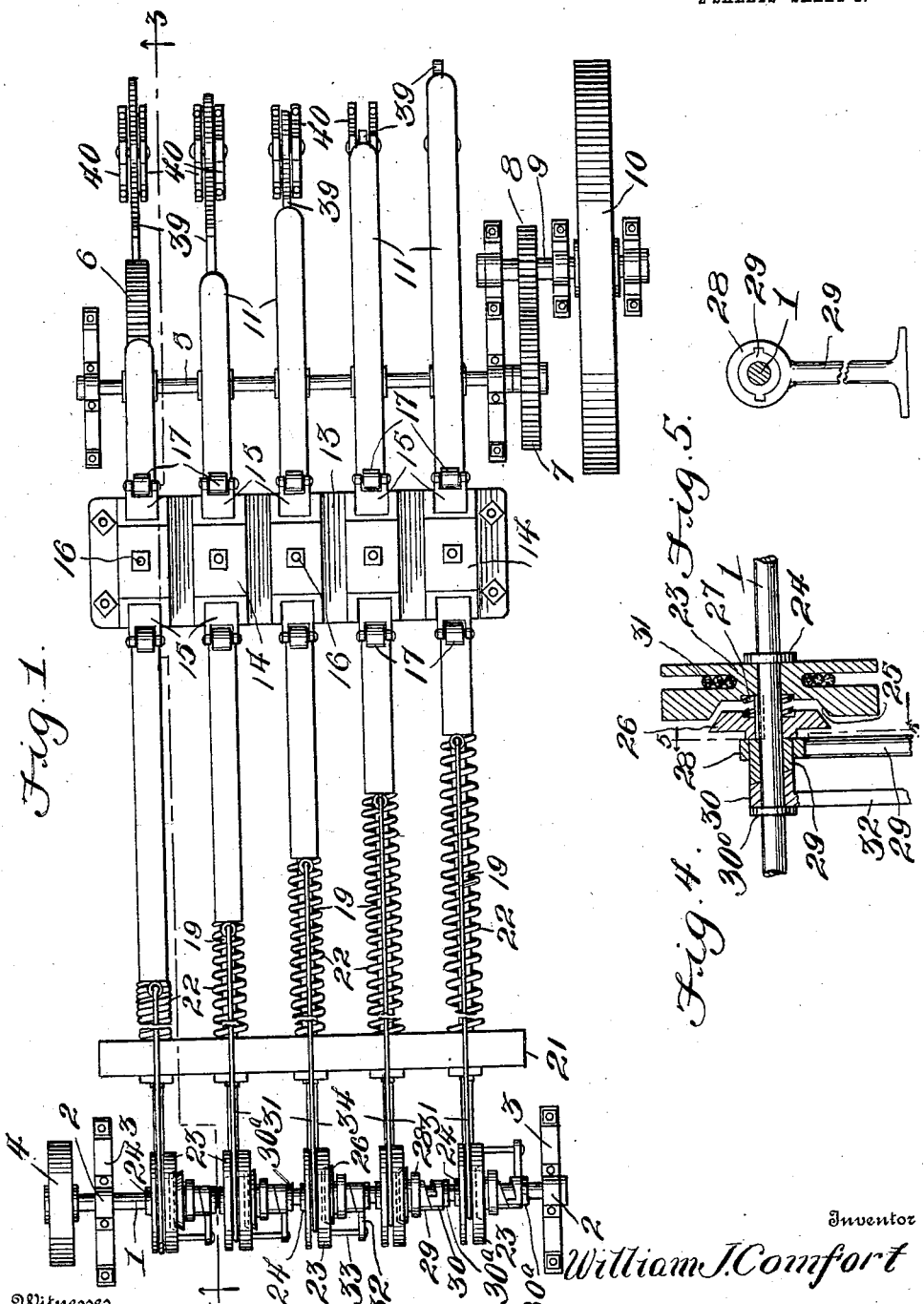

UNITED STATES PATENT OFFICE.

WILLIAM J. COMFORT, OF BROOKLYN, NEW YORK.

MECHANICAL MOTOR.

No. 914,926.　　　Specification of Letters Patent.　　Patented March 9, 1909.

Application filed June 17, 1908. Serial No. 438,975.

*To all whom it may concern:*

Be it known that I, WILLIAM J. COMFORT, a citizen of the United States, residing at Brooklyn, in the county of Kings and State of New York, have invented new and useful Improvements in Mechanical Motors, of which the following is a specification.

This invention relates to a mechanical motor for use in connection with a prime driving engine or motor of any suitable type to supplement and increase the applied power of such prime engine or motor, the object in view being to provide a simple type of auxiliary motor set in operation to store driving power by the prime motor and operated by the stored power to transfer energy to assist in operating the mechanism to be driven.

With these and other objects in view, the invention consists of the features of construction, combination and arrangement of parts hereinafter fully described and claimed, reference being had to the accompanying drawing, in which:—

Figure 1 is a top plan view of a motor embodying my invention, showing the use of a plurality of power elements, the latter being arranged to operate in order for the continuous transmission of power. Fig. 2 is a side elevation of the same. Fig. 3 is a vertical longitudinal section on line 3—3 of Fig. 1. Fig. 4 is a section through one of the clutch devices. Fig. 5 is a detail section on line 5—5 of Fig. 4.

Referring to the drawings, 1 designates a driving or winding shaft journaled in bearings 2 at the upper ends of supporting brackets 3, and carrying at one end a pulley 4 whereby it may be continuously driven from a prime motor, not shown, of any suitable type.

5 denotes a transmission shaft arranged in parallel relation to the driving shaft. This shaft 5 carries a series of fixed ratchet wheels 6 and is connected at one end through gears 7 and 8 with a driven shaft 9, which may form part of the apparatus to be driven, and which may carry a fly or balance wheel 10.

Arranged for coöperation with the ratchet wheels are reciprocating rack bars 11 which rest upon and engage the teeth of the respective ratchet wheels 6, the teeth of the bars being forwardly inclined and the teeth of the wheels rearwardly inclined to cause an engagement between the teeth when the bars move forwardly and to permit the teeth of the bars to slip over the teeth of the wheels when said bars move rearwardly or are retracted. The rack bars reciprocate through an arched guide member 12, the top wall 13 of which is provided with passages 14 for the respective bars, in each of which passages is arranged a pressure device comprising a bowed spring strip 15 centrally secured to said wall, as by a bolt 16, and provided at its ends with bearing rollers 17 engaging the upper surface of the coacting rack bar to yieldingly hold said bar in engagement with the teeth of the ratchet wheel.

The rear ends of the ratchet bars are respectively provided with depending bracket arms 18 perforated for the passage of a guide rod 19 having at its forward end a stop nut or collar 20 to limit the forward movement of the bar. The rods are fixed at their rear ends to the upper cross-bar of a suitable arched support 21, and surrounding each guide rod between said support and the bracket arm 18 of the coöperating rack bar is a coiled expansion power spring 22, said spring adapted on the rearward movement of the bar to be compressed and put under tension and to then propel the bar forward to drive the ratchet wheel.

The mechanism for retracting the rack bars and compressing the springs comprises a series of drums 23 on the shaft 1, each drum being loose on said shaft and bearing at one side against a stop collar 24 and recessed in its opposite side to form a friction face 25 to receive and be engaged by a clutch cone 26 slidably and rotatably mounted on and with the shaft 1. The clutch member is normally held out of engagement with the drum by an interposed spring 27, and is limited in outward movement by a bearing 28 upon the upper end of a standard 29, in which bearing is rotatably mounted a sleeve 29 loosely embracing the shaft 1 and adapted to be forced toward the drum by an adjusting collar or sleeve 30 held from outward sliding movement by a stop collar 30ª, the meeting faces of the said collars or sleeves 29 and 30 being beveled or inclined so as to operate as cams. It will be understood from this construction that a rearward movement of the collar 30 will result in bringing the highest portions of the cam surfaces together, thus forcing the sleeve 29 inward, and projecting the clutch member 26 to frictionally engage and clamp the drum against the collar 24 to the shaft, thus causing the drum to rotate with the shaft, while a reverse movement of said sleeve 30 will permit the clutch member to be retracted by the action of the spring 27, thus releasing the drum. Each drum is annularly grooved to receive a cable or like flexible connection, 31, which is fastened at one end therein and attached at its opposite end to the coacting rack bar, so that upon the rearward motion of the drum when clutched to the shaft the cable will be wound upon the drum to draw the rack bar backward and thus place the associated power spring under compression. Each clutch operating collar 30 is provided with a radial crank arm 32 connected by a laterally extending crank pin 33 with the rear end of a pitman or connecting rod 34.

The forward end of the pitman or connecting rod 34 has a slot and pin connection at 35 with the upper end of an intermediately pivoted shifting lever 36 mounted upon a supporting bracket 37 and coupled by a connecting rod 38 to a shifting lever 39 pivotally supported upon a bracket 40, and having its upper end lying in the path of movement of the forward end of the rack bar, the upper end of the lever 36 being arranged in the path of rearward movement of the bracket arm 18 of said bar.

The driving or winding shaft 1 is driven continuously from the primary motor through a belt connection with the pulley 4, and the motor embodying the invention is initially set into operation by a manual adjustment of the parts to start the operation of the rack bars in successive order through the compression of their springs. It will be understood that in practice the operation is so timed that but one or a relatively small number of the power devices formed by each rack bar, ratchet wheel and associated spring will be primed for action at each time by the compression of the spring thereof, the intent being to establish and maintain a mode of operation in which a single power device is retracted at a time, while the others are at progressively different stages in their power applying action.

Referring to any one of the particular rack bars and the associated mechanism, it will be understood that on the outward movement of the bar under the propelling action of its spring 22, said bar will turn the ratchet wheel 6 in a forward direction and thus transfer motion to the driven shaft 9. When the bar reaches the limit of its outward movement the forward end thereof engages and moves the lever 39, as shown in Fig. 1, to shift the lever 36 forwardly whereby the arm 32 of the associated sleeve 30 is swung forward to cause said sleeve to project the clutch member 36 and lock the coacting drum to the shaft to wind up the cable 31, thus retracting the rack bar and placing the coöperating pressure spring 22 under tension by the compression thereof. When the rack bar reaches the limit of its inward movement, the arm 18 thereof engages and reverses the motion of the lever 36, thus swinging the crank arm 32 rearwardly and releasing the clutch member from engagement with the drum, whereby the latter is freed from movement with the shaft. The spring 22 will then be free to expand and will slowly propel the rack bar forwardly against the resistance of the gearing driven thereby, the cable unwinding from the drum which turns loosely on the shaft until the spring is fully expanded and its expansive force utilized, when the bar will again engage and shift the lever 39 to lock the drum to the shaft for a repetition of the operation above described.

It will be understood from the foregoing description that through the timed operation of the power devices in this manner a constant motion may be imparted to the shaft 5 through the successive engagement of the rack bars therewith, and that as the operation of priming each power device for operation falls at a different time upon the shaft 1, and no two of such power devices are simultaneously primed, but a small amount of operating power is required from the primary motor. The shaft 9 may transmit its power to the machinery driven by the primary motor through any suitable type of gearing or connections, while, if desired, advantage in the operation of the shaft 1 may be taken of the use of the inactive stroke of the primary motor where such motor is of a type having an active or working stroke and an inactive or return stroke, thus enabling the improved motor mechanism constituting the invention to be operated from the primary motor without loss of power from the latter. Of course, the motor constructed in accordance with this invention may embody any suitable number of power elements, it being only necessary to arrange the parts so as to avoid interference in the timed action of priming these elements for operation.

Having thus fully described the invention, what is claimed as new is:—

1. A motor comprising a winding shaft, a driven shaft carrying a ratchet wheel, a winding drum loose on the winding shaft, a clutch for throwing said drum into and out of connection with the winding shaft, a reciprocating rack bar engaging the ratchet wheel, a flexible connection between said bar and the winding drum, a spring arranged to be set under tension by the rack bar when said rack bar is retracted by the winding of said connection upon the drum, so as to adapt said spring to impel said bar forward when the drum is released, and shifting means operated by the rack bar when the bar reaches the limits of its reverse movements to throw said clutch into and out of action.

2. A motor comprising a winding shaft, a driven shaft carrying a series of ratchet wheels, a series of rack bars engaging said ratchet wheels, guide rods for the rear ends of the bars, power springs on said guide rods and adapted to be compressed by the rearward motion of the bars, winding drums loose on the winding shaft, flexible connections between said drums and the respective rack bars, clutches for connecting said drums with the winding shaft, and shifting devices for the respective clutches adapted to be automatically operated by the rack bars at the limit of their movements for throwing said clutches into and out of action.

3. A mechanical motor embodying a winding shaft, a driven shaft, a ratchet wheel on said driven shaft, a rack bar engaging the ratchet wheel, a pressure device for yieldingly holding the bar in engagement with the wheel, a guide member slidably engaged by the bar, a spring carried by said guide member and compressed by the rearward movement of the bar, a drum loose upon the winding shaft, a cable connecting said drum with the rack bar, clutch mechanism for connecting said drum with the winding shaft, and shifting mechanism controlling said clutch mechanism and including levers adapted to be engaged by the bar upon its reverse movements to throw said clutch mechanism into and out of action.

In testimony whereof I affix my signature in presence of two witnesses.

WILLIAM J. COMFORT.

Witnesses:
MOSES COMFORT,
W. C. NEEDHAM.